July 13, 1948.    H. BENIOFF    2,444,911
ACOUSTIC STRUCTURE
Filed Dec. 4, 1942
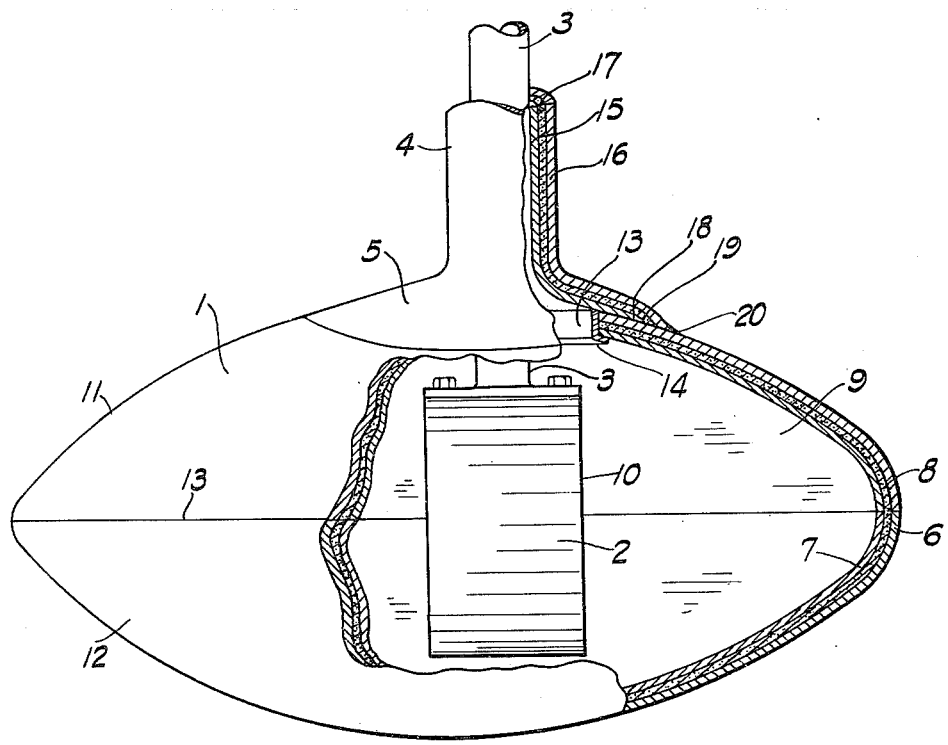
FIG. 1
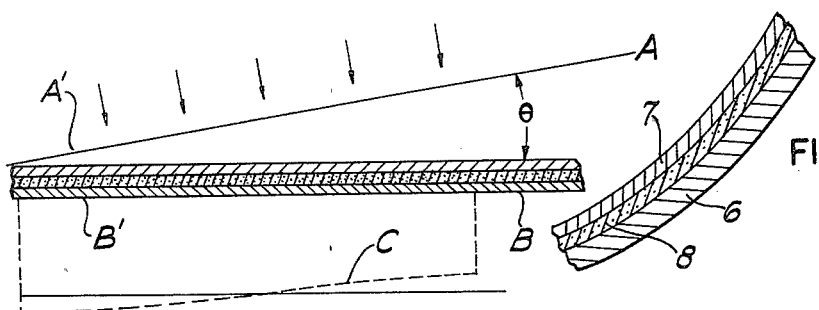
FIG. 2
FIG. 3
INVENTOR.
HUGO BENIOFF
BY Ezekiel Wolf
his Attorney Patented July 13, 1948

2,444,911

UNITED STATES PATENT OFFICE 2,444,911

ACOUSTIC STRUCTURE

Hugo Benioff, Pasadena, Calif., assignor, by mesne assignments, to Submarine Signal Company, Boston, Mass., a corporation of Delaware Application December 4, 1942, Serial No. 468,172

2 Claims. (Cl. 181—0.5)

The present invention relates to structures through which compressional waves are transmitted such as housings or casings for acoustic apparatus in which the housing permits unimpeded and undistorted acoustic conduction between the media on the outside and that on the inside in which the apparatus is situated and also to any structural arrangement or elements in the path of sound waves.

The present invention is more particularly applicable to the art of submarine signaling with the use of submarine high frequency transducers surrounded by a casing or shell through which the sound energy must pass in being transmitted from or received by the acoustic apparatus.

The present invention finds particular merit in apparatus used for sound ranging in which a beam of supersonic wave energy is transmitted through the housing structure in transmission or picked up after passing through the housing.

Housings for supersonic transducers are sometimes used in order to provide better transmitting and receiving conditions for the acoustic transducers. One of the principal purposes of such housings is to provide stream-line outline such that the apparatus may be employed on a moving vessel. The stream-lining of the housings aids in reducing water noise produced by the motion of the housing relative to the water which affects the transducer particularly when used as a receiver. By supporting the transducer in a stream-line housing structure, in which it may be rotated or directed in any direction with the housing fixed, receiving conditions may be improved while the ship is moving through the water. While these housings have proved to be very useful for such purposes and aid greatly in the reception of acoustic energy and in the elimination of water noise, nevertheless the structures themselves oftentimes produce distortion which alters the characteristics of the beam pattern of the transducer from that observed when the transducer is not in a housing. This produces undesirable effects and inaccuracies when the transducer is used to determine the direction of a reflected echo from a distant object, not only by introducing extraneous noises, but also by distorting the apparent direction from which the reflected energy is observed.

The inventor has established that this distortional effect produced by the ordinary stream-line projector housing is due in part at least to transverse waves set up in the housing by oblique sound rays passing through the structure. Such sound rays produce in the walls of the housing transverse waves, which waves travel around the housing interfering with each other, producing standing waves and local sources of radiation of sound energy in the medium within the casing. In the present invention an acoustic wall structure is provided which attenuates these transverse waves and eliminates this local radiation without seriously affecting transmission through the housing. Such a wall structure may also be used for structural elements where it is desired to eliminate the propagation of transverse waves in a manner similar to that which takes place in the structure herein described.

Where a sound wave impinges on a wall from a direction at right angles to the wall, no transverse waves are set up. However, if the wave approaches from other directions, then the wave strikes one part of the wall before it strikes another, and in consequence the portion of the wall first struck is given a transverse motion before the portion of the wall struck by other portions of the same wave front. As a result the wall bends or distorts setting up wave motion in the wall which at a number of points in the surface thereby produce secondary sound radiation.

Without further describing the merits and advantages of the present invention, the invention will be described in connection with an embodiment of the same as illustrated in the drawings in which Fig. 1 shows an elevation of my invention with some fragmentary sections to bring out details of the invention; Fig. 2 shows an enlarged section through a small portion of the housing of Fig. 1; and Fig. 3 illustrates the action of a wave inclined to a wall surface.

In the drawings, 1 represents a stream-line housing or casing which contains an acoustic transducer 2 mounted and supported by means of a shaft 3 extending through a sleeve 4 joined to the housing 1 and supporting it through a top flange member 5. The whole device may be mounted in a sea chest in a vessel from which it may be extended or it may be permanently mounted externally of the vessel by attaching the sleeve 4 to the vessel. The shaft 3 may extend upward, as indicated in the drawings, and may at its top end be provided with suitable mechanism for rotating or training the transducer 3 to the desired position to pick up the sound energy approaching the vessel. Mounting and training of such transducers are shown and described in prior patent applications such, for instance, as the application of Howard A. Satterlee, Serial No. 125,280, filed February 11, 1937, which matured into Patent No. 2,406,856, on September 3, 1946, so that no further description of this construction will be given here.

The stream-line housing which is shown broken away in Fig. 1 comprises an outer shell 6 which may be made of steel or similar metal of a high modulus of elasticity and an inner shell 7 of light durable metal as, for instance, aluminum spaced from the outer shell 6 but of the same contour as the outer shell 6 and all the surfaces parallel with the shells spaced near one another. The space between the two shells is preferably filled with a viscous material 8 which may be plastic or semi-plastic such as asphalt, pitch or a mixture of various materials. The thicknesses of the shells and of the intermediate layer of viscous material depend to some extent upon the contour, shape and size of the housing and upon the range of frequencies which it is desired to transmit and receive through the shell. For the most part it may be stated that both shells should be thin but with a reduction of frequency range for the transducing unit heavier and thicker structures may be employed.

The space 9 in the housing 1 may be filled with an aqueous or other liquid, such as water or oil or semi-plastic medium adapted to provide good acoustic transmission for the sound rays. In the usual construction of the transducer or projector 2 it is provided with one radiating or receiving surface 10 which in general faces the direction of reception and transmission of the sound waves.

The shell or housing may be made in any desired fashion. The inner shell may be made in two halves, an upper and a lower half, although it may be made as a single piece with no joints. The outer shell may be made in two halves, a top half 11 and a lower half 12, which may be assembled together by welding about the central section line 13. At the top of the stream-line housing the opening provided for the shaft 3 and for the transducer 10 may be lined with a collar 13 which may have a flange 14 welded to the inside shell of the housing. The space between the two shells may be filled either through a valve opening in the outer or inner shell or at the open edge in the top opening before the element 13 is put in place. The collar 4 and the flange 5 through which the stream-line housing is supported to the collar are both constructed in a fashion similar to that of the housing itself in that they comprise an inner shell 15, an outer shell 16 and a viscous layer 17 between the two shells. The inner shell 15 in its flange piece 18 may be welded to the outer shell 6 around the periphery 19 of the opening at the top of the shell. The outer shell 16 of the collar 4 may also have its edge welded to the outer shell 6 of the casing in the weld as indicated at 20.

In the use of the structure as described in the specification above, when the sound wave approaches from any directions obliquely to the surface of the casing, the transverse waves induced into the casing will be readily and quickly attenuated since the laminated structure of the present invention attenuates such transverse waves very rapidly. This will be seen on consideration of Fig. 3. A wave front A is approaching obliquely at an angle $\theta$ to the wall B. The left portion of the wave A', as shown in the figure, approaches the wall B before the right portion and therefore begins to cause movement of the wall in the portion B' in a direction normal to the plane of the wall ahead of motion in the portion of the wall at the right. The curve C, therefore, exhibits the manner in which a wave in the liquid distorts the structure to produce an elastic shear wave in the structure. Due to elastic properties of the wall, the distortion produced by each oblique wave is propagated along the member as a shear or transverse wave. Such waves traveling in the material generate waves in the liquid. Further, as a result of the various paths in the structure that the waves may take, standing waves are produced in the structure with consequent increased radiation in the region of standing wave loops, causing a distortion of the directive characteristics of the system for receiving and creating extraneous sound interfering with good reception. The construction herein described, however, damps these waves to such an extent that they do not set up appreciable standing waves in the walls of the device.

In the construction above described the two walls or shells 6 and 7 are parallel with each other and the thickness of the whole combination comprising the two walls and the material in between should be small compared to the wave length of the longest acoustic wave for which the structure is to be used.

Having now described my invention, I claim:

1. An acoustic housing for a receiving unit forming a substantially closed container adapted to permit the transmission of acoustic vibrations therethrough comprising an outer shell and an inner shell substantially coextensive therewith and spaced therefrom, and a viscous material filling the space between the shells, the combined thickness of the elements making up said housing being small compared to the wave length of the acoustic wave for which the structure is desired to be used.

2. An acoustic housing for a receiving unit forming a substantially closed container adapted to permit the transmission of acoustic vibrations therethrough comprising an outer shell and an inner shell substantially coextensive therewith and spaced therefrom, and a viscous material filling the space between the shells, the reflected compressional waves in the housing traveling in the direction of the surface thereof being rapidly damped.

HUGO BENIOFF.

REFERENCES CITED

The following references are of record in the file of this patent:

UNITED STATES PATENTS

| Number | Name | Date |
|---|---|---|
| 772,676 | Schiessler | Oct. 18, 1904 |
| 1,117,766 | Berger | Nov. 17, 1914 |
| 1,270,398 | Fessenden | June 25, 1918 |
| 1,345,717 | Thomas | July 6, 1920 |
| 1,438,106 | Gallagher | Dec. 5, 1922 |
| 1,440,361 | Hopwood | Dec. 26, 1922 |
| 1,451,422 | Hahnemann | Apr. 10, 1923 |
| 1,490,742 | Hull | Apr. 15, 1924 |
| 1,593,457 | Lakhovsky | July 20, 1926 |
| 1,632,331 | Hayes | June 14, 1927 |
| 1,994,495 | Williams | Mar. 19, 1935 |
| 2,405,210 | Inglis | Aug. 6, 1946 |